(12) United States Patent
Acharya et al.

(10) Patent No.: US 7,522,581 B2
(45) Date of Patent: Apr. 21, 2009

(54) OVERLOAD PROTECTION FOR SIP SERVERS

(75) Inventors: Arup Acharya, Nanuet, NY (US); Erich M. Nahum, New York, NY (US); John Michael Tracey, Scarsdale, NY (US); Xiping Wang, Putnam Valley, NY (US); Charles P. Wright, Hartsdale, NY (US); Zhen Xiao, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 11/497,948

(22) Filed: Aug. 1, 2006

(65) Prior Publication Data

US 2008/0031258 A1  Feb. 7, 2008

(51) Int. Cl.
*H04L 12/66* (2006.01)
*H04L 12/28* (2006.01)
*H04L 12/56* (2006.01)

(52) U.S. Cl. .................................. 370/352; 370/395.42

(58) Field of Classification Search ............ 370/395.42, 370/395.43, 352–356; 709/223, 227–229
See application file for complete search history.

(56) References Cited

U.S. PATENT DOCUMENTS

| | | | |
|---|---|---|---|
| 7,286,535 B2* | 10/2007 | Ishikawa et al. ............ 370/392 |
| 2004/0153497 A1* | 8/2004 | Van Dyke et al. ........... 709/201 |
| 2004/0236966 A1* | 11/2004 | D'Souza et al. ............. 713/201 |
| 2006/0031559 A1* | 2/2006 | Sorokopud et al. .......... 709/232 |
| 2006/0050683 A1* | 3/2006 | Wall et al. .................... 370/352 |
| 2007/0002834 A1* | 1/2007 | Taylor ......................... 370/352 |
| 2007/0061433 A1* | 3/2007 | Reynolds et al. ............ 709/223 |

* cited by examiner

*Primary Examiner*—Edan Orgad
*Assistant Examiner*—Hoang-Chuong Q Vu
(74) *Attorney, Agent, or Firm*—Michael J. Buchenhomer; Brian Verminiski

(57) ABSTRACT

A method for operating a server having a maximum capacity for servicing requests comprises the following steps: receiving a plurality of requests; classifying each request according to a value; determining a priority for handling the request according to the value, such that requests with higher values are assigned higher priorities; placing each request in one of multiple queues according to its priority value; and dropping the requests with the lowest priority when the plurality of requests are received at a rate that exceeds the maximum capacity. The server operates according to a session initiation protocol.

Classifying each request comprises running a classification algorithm. The classification algorithm comprising steps of: receiving a rule set, each rule comprising headers and conditions; creating a condition table by taking a union of all conditions in the rules; creating a header table by extracting a common set of headers from the condition table; extracting the relevant headers from the header table; determining a matching rule; creating a bit vector table; selecting the matching rule according to data in the bit vector table; and applying the rule to place the message in the appropriate queue.

1 Claim, 7 Drawing Sheets

OVERLOAD PROTECTION FOR SIP SERVERS

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems, and more particularly relates to the field of server overload control.

BACKGROUND OF THE INVENTION

The Session Initiation Protocol (SIP) has become a popular control protocol for many applications such as voice over internet (VoIP) and instant messaging (IM). These services are provided by SIP servers. Each of these sessions may have a different value to a service provider (operator), or a value with regard to service revenue or customer satisfaction. Overload is an inevitable condition for servers. Flash crowds, emergencies, and denial-of-service attacks can all initiate loads that exceed a server's resources. Therefore, servers should be designed with overload in mind. Given that a server cannot handle all of the requests it receives, it would be desirable for it to handle those requests which produce the most value for its operator. For example, "911" emergency calls should take precedence over other calls; text or picture messages may generate more revenue than local calls; and dropped calls are more frustrating for users than "system busy" messages. Furthermore, each operator may have different policies and values associated with each type of message.

SIP servers can become overloaded (server load exceeding its maximum capacity) despite being provisioned correctly. During overload, pending requests are dropped to decrease the server load and bring the load down to maximum server capacity. However, the indiscriminate dropping of requests can be costly because the requests dropped may have had a high value while those not dropped could have had a relatively low value. Clearly, under overload conditions, not all pending requests can be handled; therefore, the requests are to be prioritized. In prioritizing there is an additional component of servicing requests that should be considered, which is that the service delay could vary with the type of service request. In that case, it is not sufficient to handle the requests in terms of highest value first, and has to be a trade-off between delay and value.

Overload control can be implemented in multiple ways. Overload control in general entails dropping messages in order to reduce load. Clearly, message dropping needs to happen early in the processing path of a message to minimize the amount of processing (CPU, I/O etc) resources spent on a message that will ultimately be dropped. With that in mind, the different options for overload control are:

Support overload control at the network interface card (NIC) itself. While this allows a message to be dropped as early as possible, it requires additional processing support on a NIC.

Support overload control within the kernel. Overload control within the kernel eliminates the need for additional processing on the NIC, yet allows messages to be dropped before they are copied to the application, thus reducing the processing resources required compared to application-level support for overload control. Moreover, overload control within the kernel enables efficient layer-7 load balancing.

Require each application/proxy to support overload control. The drawback to this method is that by this time, the message has traversed a path from the NIC through the kernel to the application space, consuming processing (and host-NIC transfer) resources. This drawback is further exacerbated when using SIP software that runs on a Java Virtual Machine (e.g. SIP support on Websphere) since this involves additional execution path within the Java VM. The case for overload in this scenario arises when a proxy is supporting a large number of users, such as a VoIP service provider like Vonage, and clients come back up at roughly the same time after a regional loss of network connectivity (and thus requiring the clients to re-register).

Proxy-to-proxy interconnections. The more common case for overload control is for proxy-to-proxy interconnections. This is because proxies in the core of a service provider network, for example, will receive requests from proxies in other service providers, and this produces a much higher volume of requests than an access proxy which supports only user-agents and perhaps a connection to a few gateway proxies.

An SIP infrastructure may include user agents and a number of SIP servers, such as registration servers, location servers and SIP proxies deployed across a network. A user agent is an SIP endpoint that controls session setup and media transfer. All SIP messages are requests or responses. For example, INVITE is a request while "180 Ringing" or "200 OK" are responses. An SIP message may include a set of headers and values, all specified as strings, with a syntax similar to HTTP but much richer in variety, usage and semantics. For example, a header may occur multiple times, have a list of strings as its value, and a number of sub-headers, called parameters, each with an associated value. In the following example, Alice invites Bob to begin a dialog:

```
INVITE sip:bob@biloxi.com SIP/2.0
Via: SIP/2.0/UDP pc33.atlanta.com;branch=z9h
Max-Forwards: 70
To: Bob <sip:bob@biloxi.com>
From: Alice <sip:alice@atlanta.com>;tag=192
Call-ID: a84b4c76e66710@pc33.atlanta.com
CSeq: 314159 INVITE
Contact: <sip:alice@pc33.atlanta.com>
Content-Type: application/sdp
Content-Length: 142
(Alice's SDP not shown)
```

Setup sessions between user agents. (such as an INVITE) are routed by the proxy to the appropriate destination user agent based on the destination SIP URI included in the message. A session is set up between two user agents through an INVITE request, an OK response and an ACK to the response. The session is torn down through an exchange of BYE and OK messages.

SIP separates signaling from the media—signaling messages are carried via SIP, whereas media is typically carried as RTP (Real-time Transport Protocol) over UDP (User Datagram Protocol). Signaling messages are routed through the different SIP servers while the media path is end-to-end. The body of a session setup message (e.g., INVITE) describes the session using Session Description Protocol (SDP). The IP address and port numbers exchanged through SDP are used for the actual data transmission (media path) for the session. Any of these parameters can be changed during an ongoing session through a RE-INVITE message, which is identical to the INVITE message except that it occurs within an existing session. The RE-INVITE message is used most often in mobile networks to support handoff of an existing VoIP call due to user mobility (and subsequent change of endpoint addresses).

SIP messages primarily belong to three functional classes: (a) session setup/modification/teardown, (b) instant messaging and (c) event subscription/notification. RFC 3261 defines the basic set of messages and interactions that define sessions, such as REGISTER (for registering a user agent), INVITE, and ACK for session setup, BYE for session teardown, and a variety of other control messages such as OPTIONS. The MESSAGE request is an extension for 'paging-mode' instant messaging and the more recent, Message Session Relay Protocol (MSRP) defines methods for session-mode instant messaging. Another set of extensions, called SIMPLE, enable presence applications with the PUBLISH, SUBSCRIBE, and NOTIFY primitives for event notification.

SIP can operate over multiple transport protocols such as UDP, TCP (Transmission Control Protocol) or SCTP (Stream Control Transmission Protocol). Use of UDP is probably more prevalent today especially for proxy-to-proxy connections, but TCP usage is expected to grow. Additionally, when using TCP, SIP can use SSL (secure sockets layer) for security and encryption. It may also use IPSec underneath any of the transport protocols as well.

There is a need for a method and system to overcome the shortcomings of the prior art with respect to prioritizing service requests so that, under overload conditions, revenue is maximized by servicing the higher-value requests first.

SUMMARY OF THE INVENTION

Briefly, according to an embodiment of the invention, a method for operating a server having a maximum capacity for servicing requests comprises the following steps: receiving a plurality of requests; classifying each request according to a value; determining a priority for handling the request according to the value, such that requests with higher values are assigned higher priorities; placing each request in one of multiple queues according to its priority value; and dropping the requests with the lowest priority when the plurality of requests are received at a rate that exceeds the maximum capacity. The server operates according to a session initiation protocol.

Classifying each request comprises running a classification algorithm. The classification algorithm comprising steps of: receiving a rule set, each rule comprising headers and conditions; creating a condition table by taking a union of all conditions in the rules; creating a header table by extracting a common set of headers from the condition table; extracting the relevant headers from the header table; determining a matching rule; creating a bit vector table; selecting the matching rule according to data in the bit vector table; and applying the rule to place the message in the appropriate queue.

BRIEF DESCRIPTION OF THE DRAWINGS

The following detailed description of an exemplary embodiment of the invention with reference to the drawings is used to describe the foregoing and other exemplary purposes, aspects, and advantages of the invention, in which.

DETAILED DESCRIPTION

Described is a system and method for classifying and prioritizing server requests using operator-specified metrics of value/revenue, so that under overload conditions, revenue is maximized by servicing the higher-value requests first. A novel solution is to leverage the rich header information contained within SIP messages to classify the incoming stream of messages according to operator-defined rules; and then based on the classification, deliver the highest priority messages to the server first. This is achieved with a novel SIP message classification algorithm. Although its use is not limited to SIP servers; for simplicity, the present discussion of the invention focuses on the system and method as it relates to SIP servers. The present discussion also focuses on message value and assumes that the service delay is the same for all request types. In some scenarios, the service delay will be different for each request type. This can be handled by normalizing the value per messages against service delay, i.e. value/service delay can be used instead of just the value without any change to the algorithm.

Figure 1A:
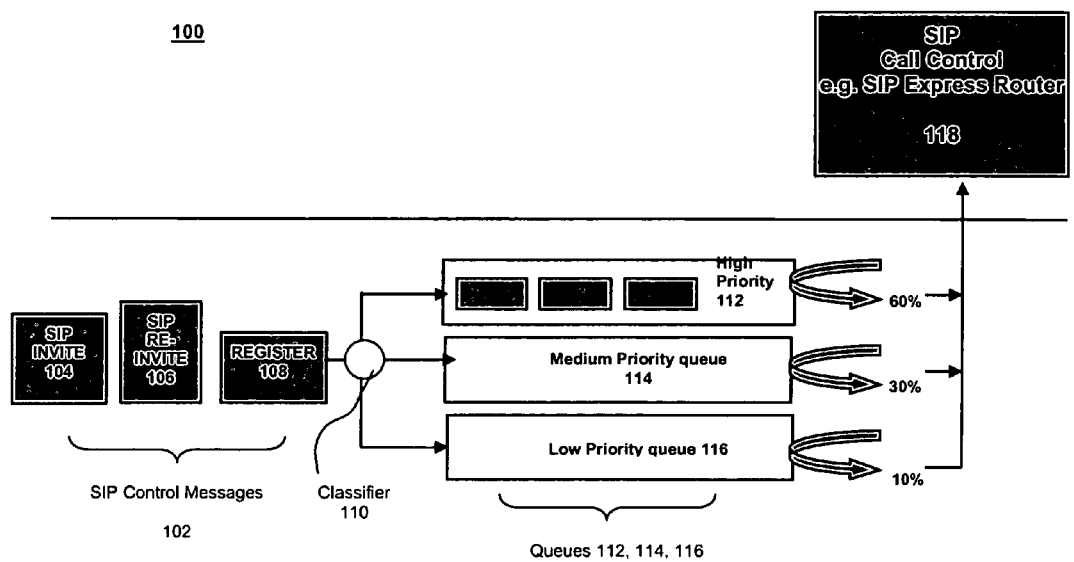
FIG. 1A is a high level block diagram of a system for handling SIP requests, according to an embodiment of the invention.

Referring to FIG. 1A, there is shown a high level block diagram of a system 100 for handling SIP messages. An input stream of SIP messages 102 is received at a user-programmable classifier 110 which classifies the messages and places each in one of three or more queues 112, 114, 116 according to the classification. The SIP messages 102 include INVITE (session initiation) requests 104, RE-INVITE (session modification) requests 106 and REGISTER (bind a user to an address) requests 108. The queues include a high priority queue 112, a medium priority queue 114, and a low priority queue 116. The priorities are set according to the value attributed to them so that a more valuable message is given a higher priority. An SIP call controller 118 (e.g., an SIP express router) controls the scheduling policy. The SIP classifier 110 comprises an SIP classification algorithm. The classification algorithm has a static and a runtime component. The static component includes rule parsing and creating several tables and bitmaps that allow the runtime portion to operate efficiently. A novel algorithm according to one embodiment of the present invention uses three tables: a header table, header value table and a condition table that store the required message headers, values of those headers and the conditions to evaluate, respectively. Finally, the present invention uses a list of rules that are expressed as bitmaps, where each bit represents the conditions that must be true for the rule to be matched. Each rule has an associated set of actions, one of which being a priority for the packet.

Figure 1B:
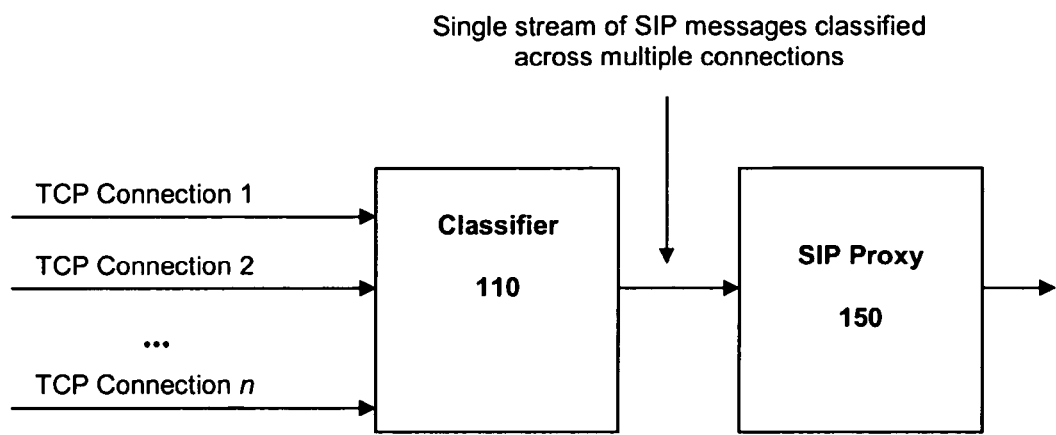
FIG. 1B is an illustration of a single stream of SIP messages classified across multiple connections.

FIG. 1B illustrates a single stream of messages classified across multiple TCP connections by the Classifier 110 before being routed to the SIP proxy server 150.

Figure 2:
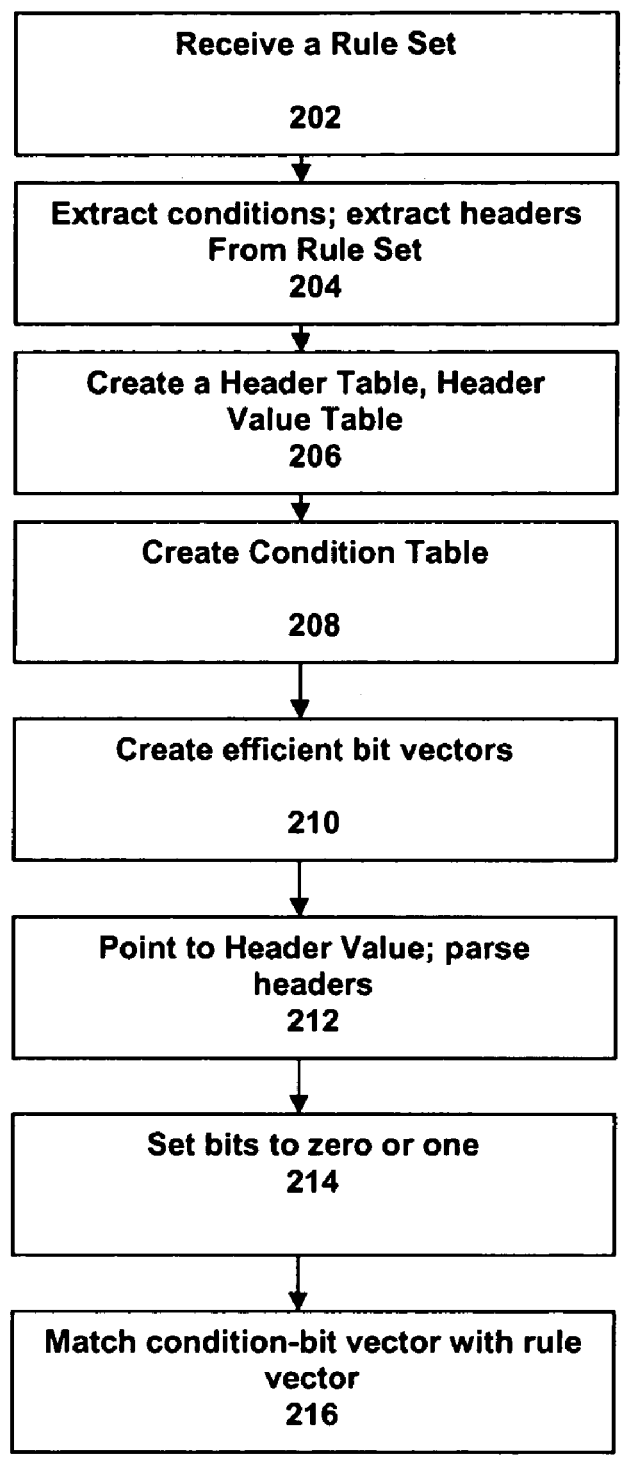
FIG. 2 is a flow diagram of the classification algorithm of FIG. 1, according to an embodiment of the invention.

Referring to FIG. 2, there is shown a flow diagram of the classification algorithm of FIG. 1, according to an embodiment of the invention. The process begins at step 202 when the SIP server 100 receives a rule set. A rule set may be defined as a list of rules where each rule consists of a conjunction of conditions resulting in an action, along with a priority for each rule. The rule set could be provided by a telephony service provider. In step 204 the algorithm proceeds to extract a set C of unique conditions from the rule set specified. From the set C, a set H of unique headers is extracted. The headers are classified into one of three categories: pseudo-headers, simple headers and derived headers. Simple headers exist as such in SIP messages such as From, Call-ID. Pseudo-Headers do not appear as such in an SIP message, but allow us to refer to certain strings or characteristics of the message. For example, MSG_TYPE is a pseudo-header that is defined to represent the type of the SIP message such as an INVITE or a 200/OK. Another pseudo-header is MSG_PROTOCOL, which is whether the message was received via TCP, UDP, or TLS (SSL). The list of pseudo-headers currently comprises: MSG_TYPE, MSG_PROTOCOL, MSG_METHOD, MSG_STATUS, and others.

Derived Headers are constructed from one or more other headers. Sub-headers, such as "From.tag", comprise one class of derived headers. In this case "From.tag" represents the value of the tag parameter in the "From" header. Sub-headers comprise of pre-defined composite strings of the form X.Y where X represents a simple header, and Y represents either one of the RFC 3261 specified parameters than can appear in the value for header X or a list of tokens that is defined to represent specific values of interest in the header (e.g., "From.URI" represents the URI portion of the From header value (a list of such tokens is in the appendix). Another type of derived headers includes a user-specified ordered list of Message headers (either simple headers or recursively, other derived headers). For each derived header in this set, the algorithm recursively includes the list of simple (or derived) headers that comprise that derived header, e.g. the Dialog derived header will include the derived headers From.tag and To.tag as well as the simple header Call-ID. Next, it is shown how user-defined derived headers are specified. The form of this specification is as follows:

Derived Header={(Derived-Header|Simple Header)*}

The above-mentioned Dialog derived header would be defined as: Dialog={From.tag, To.tag, Call-ID}. Individual elements of a user-defined derived header are indicated by dotted notation, such as Dialog.From.tag or Dialog.Call-ID.

In conjunction with user-defined derived headers, the present invention also allows the user to specify complex data types such as structures and complex data variables such as associative arrays and pointers, as well as scalars. The basic data types are string and integer. Any time a user defines a derived header like Dialog, a type of the same name is also implicitly created. A structure may be defined as a data type consisting of a collection of data types. For example: Struct Session={Dialog-ID Dialog, String State}. In this example, the element "State" stores the state of a dialog which could be "established," "setup," or "shutdown." Simple and user-defined types can be used to instantiate variables, which may be scalars, pointers, or associated arrays (hash tables). To differentiate these types of variables, each variable is prefixed with "$", "*", or "%" for scalars, pointers, and associative arrays, respectively. Associative arrays should be defined in terms of a structure. The first element of the structure is the key, and the remaining elements are the values. A list can be created by using an associative array with keys, but not values. Pointers can only reference elements within an associative array.

All variables are assumed to be global in scope unless explicitly specified to be of local scope. A variable with a global scope exists for the lifetime of the classification process, i.e. it retains its existence across classification of individual messages and its value can be modified as a result of classifying individual messages. Global variables are typically used to maintain state that is dynamically generated and modified by the classifier (e.g. an associative array of dialog-ids for ongoing SIP sessions). In contrast, a locally scoped variable does not share its value across messages, and in fact, retains its value only within the context of a specific rule execution. Moreover, multiple instances of a local variable can be concurrently instantiated (e.g., if the classifier is running on a multi-processor system it can process multiple packets at the same time). Local variables such as pointers are used to extract an element of a globally scoped list that matches with some set of header values in the message currently under classification. For example, to maintain a count and an array of session information, three variables could be used. A scalar integer suffices for the count: Int: $ActiveSessionCount. The array would use the Session structure previously defined as: Session: %ActiveSessions. Finally, a local reference to the %ActiveSessions table is created as: Local Session: *CurrentSession.

In step 206 a Header Table is created, where each row contains a header from the set H. See Table 1. The format of each row is <Header, Header-Type, List of indices, fn>. The Header is the actual string representation, such as "From", or "From.tag," "Dialog," or "MSG_TYPE." Header-Type refers to whether it is a simple, derived or a pseudo-header. For headers of the derived type, there is a corresponding ordered list of indices referring to the simple and pseudo-headers (or other derived headers) comprising a derived header, e.g. Dialog would refer to the indices for "From.tag". "To.tag", "Call-ID". For pseudo-headers and derived headers, the element fi refers to a function that can extract the value of the derived header from its component simple and derived headers. For example, the function pointer for Dialog encodes the necessary logic to create a dialog id by walking through the associated list of indices, and recursively calling the associated functions for each derived header in the list such as the function for "From.tag" and composing it with the value of any simple header such as Call-ID from the list.

TABLE 1

Header Table.

| Header | Header-Type | Indices | Fn |
|---|---|---|---|
| From | Simple header | | NULL |
| To | Simple header | | NULL |
| From.tag | Derived header | (0) | ExtractTag( ) |
| To.tag | Derived header | (1) | ExtractTag( ) |
| Call-ID | Simple header | | NULL |
| MSG_TYPE | Pseudo header | | ExtractType( ) |
| Dialog | Derived header | (2, 3, 4) | MakeTuple( ) |

TABLE 2

Header Value Table.

| Header | Header Type | Matched Value | Type of Value |
|---|---|---|---|
| From | Simple header | Alice <sip:alice@atlanta.com> | String |
| To | Simple header | Bob <sip:bob@biloxi.com> | String |
| From.tag | Derived header | 123 | String |
| To.tag | Derived header | NULL | String |
| Call-ID | Simple header | D11ECD964F3B@9.2.11.82 | String |
| MSG_TYPE | Pseudo header | INVITE | String |
| Dialog | Derived header | {From.tag, To.tag, Call-ID} | Tuple |

Next a Header Value Table is created (see Table 2), which is associated with the Header Table. The format of each row is <Header, Header-Type, Matched Value, Type of Value>. In the Header Value Table, for every header (index) in the Header Table will eventually hold a value in the Header Value Table, e.g. the "From" header in the Header Table will contain "sip:xiping@" in the associated entry for the Header Value Table. These values will be populated during run-time, i.e. when a message is being classified. For pseudo-headers and derived headers, the associated function fn when executed will place the result (value) of the execution in the corresponding location/index in the Header Value Table. Each row, in addition to the value, also contains a type of value which could be a string, list of strings, tuple, integer, or NULL.

In step 208 a condition-table is created (see Table 3). The aim is to efficiently represent conditions by storing pointers to header values of an SIP message under classification. At run time, the requisite header values can be referenced in constant time for efficient evaluation of these conditions. In a condition-table, each row represents a condition in the set C and comprises: <operation, op1, op2, Assignment-variable>. In general, op1 is an index to a header table, and the literal is a fixed operand to which the header is compared. The operation is one of the mathematical operators defined here below (==, !=, belongs-to, subset, superset). The operators are of three types according to their corresponding operands: comparison operators for case strings, list parent/child operators, and operators for list values.

A rule may comprise a conjunction (AND) of conditions resulting in an action, along with a priority for each rule. Example: C1 AND C2 AND C3→A1, Priority. Disjunctions (OR) do not need to be supported since disjunction of conditions can be expressed as separate rules, without loss of generality. Example: C1 AND (C2 OR C3)→A1, P1. This is equivalent to the two rules: C1 AND C2→A1, P1 and C1 AND C3→A1, P1. Rules with the numerically higher priority value have precedence over those with lower value. For rules with the same priority value, the first matching rule will be applied.

Conditions are of the form "Header op Literal." The header may be a simple header, pseudo-header, or a derived header. The operator can be ==, subset, superset, or belongs-to. The belongs-to operator also supports an optional assignment to a pointer.

1. SIP Message Header == String
2. SIP Message Header subset list-of-strings
3. SIP Message Header superset list-of-strings -continued 4. SIP Message Header belongs-to @List
5. *Pointer = (SIP Message Header belongs-to @List)

The invention also supports negation for ==, subset, superset, and belongs-to (without assignment).

The typical use of string equality (==) or inequality (!=) is to check whether a message header has a specific value or not. Note that all SIP message headers are strings, by definition. Examples:

From.URI == sip:xiping@atlanta.com
Contact == host1.watson.com

The subset and superset operators are for multi-valued headers. For example, "Via superset {Proxy1, Proxy2}" expresses the condition that a Via header exists for both Proxy1 and Proxy2. Similarly, "Via subset {Proxy1, Proxy2, Proxy3}" expresses the condition that via headers exist only for some combination of Proxy1, Proxy2, and Proxy3. In conjunction, subset and superset can be used to express set equality (i.e., "Via subset {Proxy1, Proxy2} AND Via superset {Proxy1, Proxy2}" means that the Via headers contain precisely Proxy1 and Proxy2).

The belongs-to operator is used to find headers in the classifier's state lists (i.e., a list of Dialog-IDs). For example, "Dialog-ID belongs-to %ActiveSessions" expresses the condition that Dialog-ID is a key in the associative array ActiveSessions. This operator returns a "true" value by returning a pointer to the element in the list that matches the Header-tag; it returns a "false" value if no match is found. Thus, it serves a dual-use of evaluating true/false value of a condition and in addition, returning a pointer value. Thus, the invention supports a special assignment operator, =, that prefixes a condition of the form, Header-tag belongs-to Array.

The string equality (==and !=) and belongs-to operators can only be used on simple headers (i.e., headers which are not set-valued). These headers are: Alert-Info, Authentication-Info, Call-ID, Content-Disposition, Content-Length, Content-Type, CSeq, Date, Error-Info, Expires, From, Max-Forwards, Min-Expires, MIME-Version, Organization, Priority, Reply-To, Retry-After, Server, Subject, TimeStamp, To, User-Agent, Warning.

The following headers are set-valued, and can only be used with the subset and superset operators: Accept, Accept-Encoding, Accept-Language, Allow, Authorization, Call-Info, Contact, Content-Encoding, In-Reply-To, Proxy-Authenticate, Proxy-Authorization, Proxy-Require, Record-Route, Require, Route, Supported, Unsupported, Via, WWW-Authenticate. The invention also supports an additional assignment operator (=), as an extension of the belongs-to operator. Sub-headers are expressed as header.tag, e.g. "From.To" represents the "To" tag in the "From" header. The keyword MSG_TYPE will be used to represent message type (e.g., INVITE) since there is no separate header for the message type in the SIP message.

The classification algorithm, according to an embodiment of the invention, is further described as follows:

1. Extract a set C of unique conditions from the rule set specified. From the set C, extract a set H of unique headers: header may be pseudo-headers, simple headers and derived headers. For each derived header in this set, recursively include the list of simple (or derived) headers that comprise that derived header, e.g. the Dialog derived header will include the derived headers From.tag and To.tag as well as the simple header Call-ID. The derived headers From.tag and To.tag would recursively lead to the inclusion of "From" and "To" in the set H.

In case string comparisons, i.e. !=(NOT EQUAL), ==(EQUAL), the first operand, op1 refers to the literal string that is being compared to a specific SIP message header value. That specific SIP header is specified by an index in the Header-Table (HT). The second operand, op2, in this case is thus an index in the HT. The fourth element of the row is unused. An example of this type of entry is as follows, representing the condition "From=='Charles'": <==, "Charles", 0, NULL>. Here, HT[0] (Index 0 in the Header Table) represents the SIP message header "From."

When the operation is belongs-to, the first operand refers to a list and the second operand refers to a SIP message header or a derived header, e.g. [*S1=(Dialog belongs-to % L1)]. Dialog is a derived header and may include multiple headers: the tag parameter in the "From" header, the tag parameter in the "To" header and the "Call-ID" header. So, this condition will be represented by a row in the condition-table as follows: <belongs-to, 2, %L1, *S1>. Here, HT[2] refers to the derived header "Dialog."

In the case of subset and superset operators, the first operand, op1, is a list of values and the second operand is an SIP message header such as "Via" whose value in a SIP message is a list. For example, a condition such as "Via subset {proxy1, proxy2}" will be represented as <subset, <proxy1, proxy2>, HT[3], NULL> where HT[3] is the entry in the header-table representing the "Via" header.

TABLE 3

Condition Table.

| Op | Op1 | Op2 | Assignment-variable |
|---|---|---|---|
| == | 0 (Method) | INVITE | |
| == | 3 (To.tag) | NULL | |
| == | 4 (From.URI) | sip:carol | |
| == | 4 (From.URI) | sip:alice@atlanta.com | |

In step 210 a bit-vector of conditions (condition-bit-vector) is created for each rule, where bit i refers to the ith condition in the Condition-Table (Table 3). The implication is that this bit will be set to 1 if the ith condition is true for a message being classified. For each rule, the rule-bit-vector specifies the ith bit is 1 if the rule specification includes the ith condition. The rule-bit-vectors are sorted in descending order of priority within the bit-vector-table (bitmap), so that when rules are matched to a message, the matching process can be stopped at the first matching rule. If no match is found, the packet is given the lowest possible priority.

Using the condition table, the rules can be expressed as a bitmap. For example Method=="INVITE" AND To.tag==NULL is expressed as 1100, with each bit corresponding to an index in the condition table. Similarly, Method=="INVITE" AND From.URI="sip:carol" and From.URI=="sip:alice@atlanta.com" are expressed as 1010 and 1001, respectively. Each condition/row in the Condition-Table will be evaluated, resulting in a condition-bit-vector value of 10011, since conditions C1, C4 and C5 are true. Next, this pattern will be 'matched' with each rule vector to determine the matching rules, which are R1 and R4. If the rules were sorted in decreasing order of priority, i.e. R2, R1, R3 and R4, then each rule does not need to be matched since the matching process can be stopped after the first matching rule is found (which is R1 in this case). See Table 4.

TABLE 4

Rule Vector Table

| R1 | From == "Arup" | AND | To == "Xiping" | | | A1, 3 |
| R2 | MSG_TYPE=="Register" | AND | | | | A2, 5 |
| R3 | MSG_TYPE=="INVITE" | AND | From== "Erich" | AND | To=="Xiping" | A3, 2 |
| R4 | MSG_TYPE==INVITE | AND | From=="Arup" | | | A3, 2 |

Run-time: Classification actions per-message

Rule Definition Syntax. The exemplary rule definition syntax follows the following BNF grammar. Italics are used for grammar symbols, bold characters for string literals, and roman type for alphanumeric strings (e.g., identifiers). The starting symbol is "RuleSet", which is made up of type declarations, variable declarations, and one or more rules.
RuleSet=TypeDeclaration VarDeclaration* Rule+

Type definitions may include user header declarations (e.g., defining the user's derived headers) and structure definitions.

TypeDeclaration = (UserHeaderDeclaration|StructureDeclaration)*
UserHeaderDeclaration = TypeName =
{ (Header|UserHeaderDeclaration) (,(Header|UserHeaderDeclaration) ) * }
StructureDeclaration = Struct TypeName = { TypeName FieldName
(, TypeName FieldName) * }

After the types are defined, the variables can be defined.

VarDeclaration=(Local)?TypeName: Kind VarName (,
Kind VarName)*

A variable is of a type (TypeName references one of the user-defined types), and its kind is one of the following: Kind=$|%|*. For scalars, associative arrays, and pointers to array elements, respectively:

Rule=Condition (AND Condition)*→Action (,
Action)*

Wherein each rule is comprises one or more conditions and a set of actions.

The conditions are of the form:
Condition=Header  (((==|!=)String)|((subset|superset) {String (, String)*})|(belongs-to % List))|VarName=(Header belongs-to % List). The Action is composed of assignments and coloring, as follows:

Action = (Assignment | Coloring) +
Assignment = (VarName = Value | VarName.FieldName = Value)
Coloring = ColorName

EXAMPLE

Condition-bit-vector:

| C1 | C2 | C3 | C4 | C5 |
|----|----|----|----|----|

Rule Bit-vectors:

| R1: 10010 | R2: 00100 | R3: 01011 | R4: 10001 |
|-----------|-----------|-----------|-----------|

During run-time message processing, assume the following INVITE message is sent from Arup to Xiping:

```
INVITE sip:arup@us.ibm.com SIP/2.0
From : Arup
To : Xiping
<message text begins> <message text ends>
```

Once the header matching algorithm is run on this message, in step 212 the Header-Value Table will be populated as shown in Table 2. For each header in the Header-Table, the Classifier 110 determines whether the header exists in the SIP message and if so, returns a pointer to the header value in the message. Rather than iterate over each header, efficient multi-pattern string matching algorithms may be used, which can look for multiple patterns (headers) simultaneously using a single iteration. In this example, an embodiment of the present invention uses the SIP parser from the osip open source software to parse all the headers, resulting in a table where each row may comprise <SIP Header, Pointer to the header value in the message>. In another embodiment, this is enhanced to scan for only the headers listed in the Header-Table. The end-result of this step 212 is to populate each header entry in the Header-Table with a pointer to the position in the SIP message corresponding to the value of the matching header.

Step 214 proceeds by walking through each row (condition) in the Condition-Table and setting the corresponding bit in the Condition-Bit-Vector to zero or one, depending on whether the condition is true/false. For each entry, the Pointer-to-Header-Table is used to index into the Header-Table to determine the value of the matching header in the SIP message. That value is used to evaluate the condition. Continuing with step 216, the Classifier 110 next determines which of the rules match the given packet. This is done by walking through the bit-vector-table, and matching the Condition-Bit-vector with each rule-bit-vector. Rule R matches if [bit-vector(R) bitwise-AND condition-bit-vector==bit-vector (R)]. In other words, if the ith is 1 in the bit-vector for rule R, then the same bit must be 1 in the ith condition-bit-vector. If R contains the ith condition, then the value in the matching header of the SIP message must cause this condition to be true, in order for R to apply. Since the rule-bit-vectors are sorted according to priority, the matching process can be stopped after the first matching rule (since that is the highest-priority matching rule).

As stated earlier the different options for effecting overload control are: 1) Support overload control at the network interface card itself; 2) support overload within the kernel; 3) each application/proxy supports overload control; and 4) proxy-to-proxy interconnections. For proxy-to-proxy interconnections, all messages are sent over a common transport connection (TCP or UDP) that is secured by IPSec. Since IPSec implementation is in the kernel, the Classifier 110 can look at the SIP messages in the clear.

Because the classification engine is programmable, it can be used in multiple contexts in addition to overload control. For example, the Classifier 110 can be used as an SIP-aware load balancer in front of an SIP server farm to provide either transaction affinity or session affinity. It could potentially be also used to prevent denial-of-service attacks by programming it with rules that drop undesirable messages. There are multiple different scenarios and their corresponding architectures where a fast, efficient classification engine could be useful.

In one overload scenario a proxy (SIP server) 150 serves multiple clients (user agents). In this case, each client has a separate transport connection to the proxy 150, either by UDP, TCP, or SCTP (Stream Control Transmission Protocol). Additionally, the client-proxy connection could be formatted using SSL (Secure Sockets Layer). The Classifier 110 inspects clear text (i.e., unencrypted) SIP headers to make its decisions, so that SSL connections are terminated by a component that is interposed between the user agent (UA) and the Classifier 110. This component will terminate the SSL connections, and then forward unencrypted data to the Classifier 110 using a secure channel. There are three distinct scenarios that allow this termination: (1) traditional user-space SSL termination, (2) in-kernel SSL termination, or (3) termination on a dedicated server.

Figure 3:
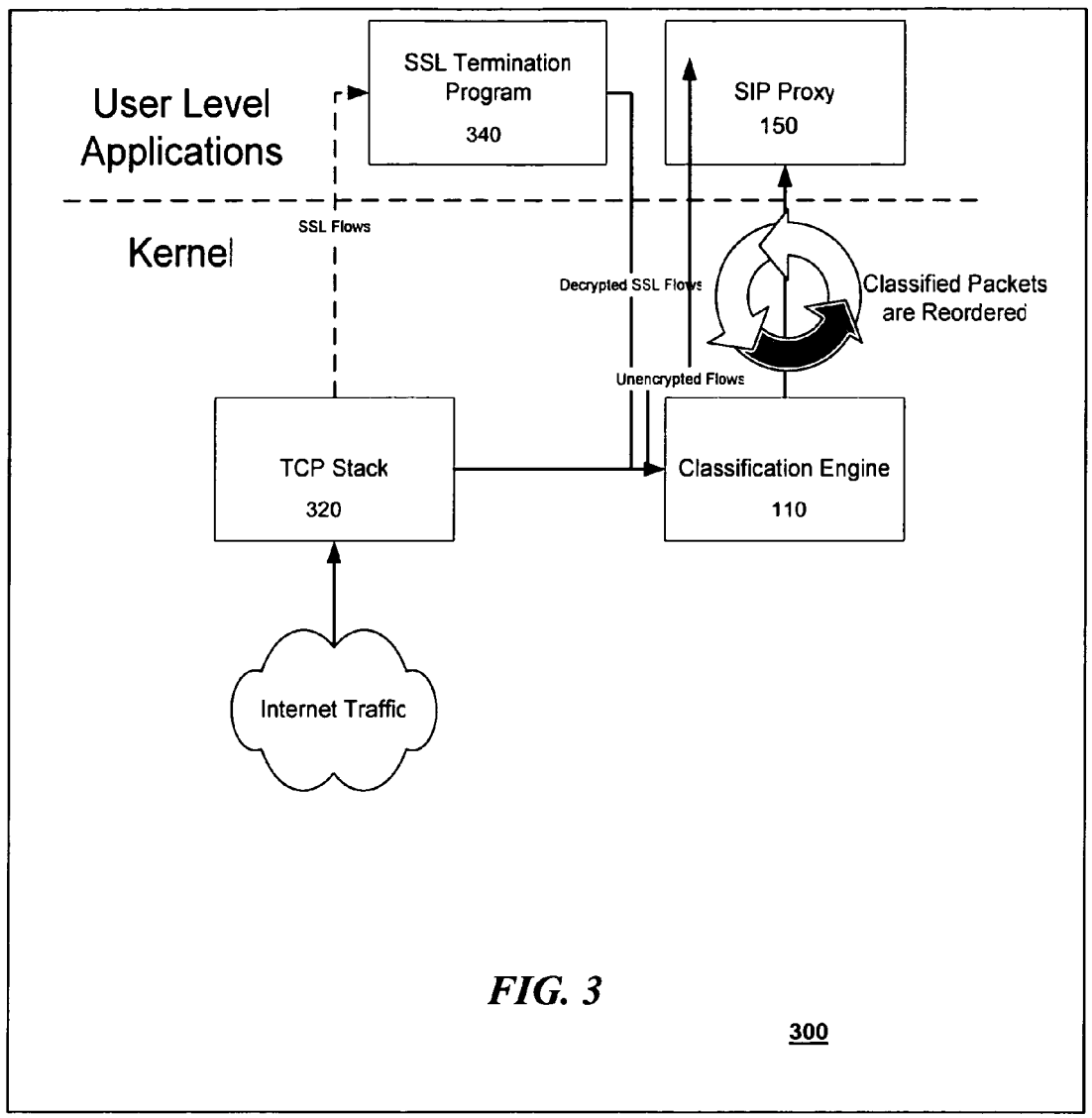
FIG. 3 is a high level diagram showing an embodiment of the invention with a user-level SSL termination.

FIG. 3 shows a traditional user-space SSL termination scenario. This termination requires little development effort, but has the worst performance, because data should be copied between the user-level program 340 and the kernel. In this termination scheme, a TCP Stack 320 is received by an SSL Termination Program 340. The decrypted SSL packets flow to the Classifier 110. The classified packets are reordered before being sent to the SIP Proxy 150.

Figure 4:
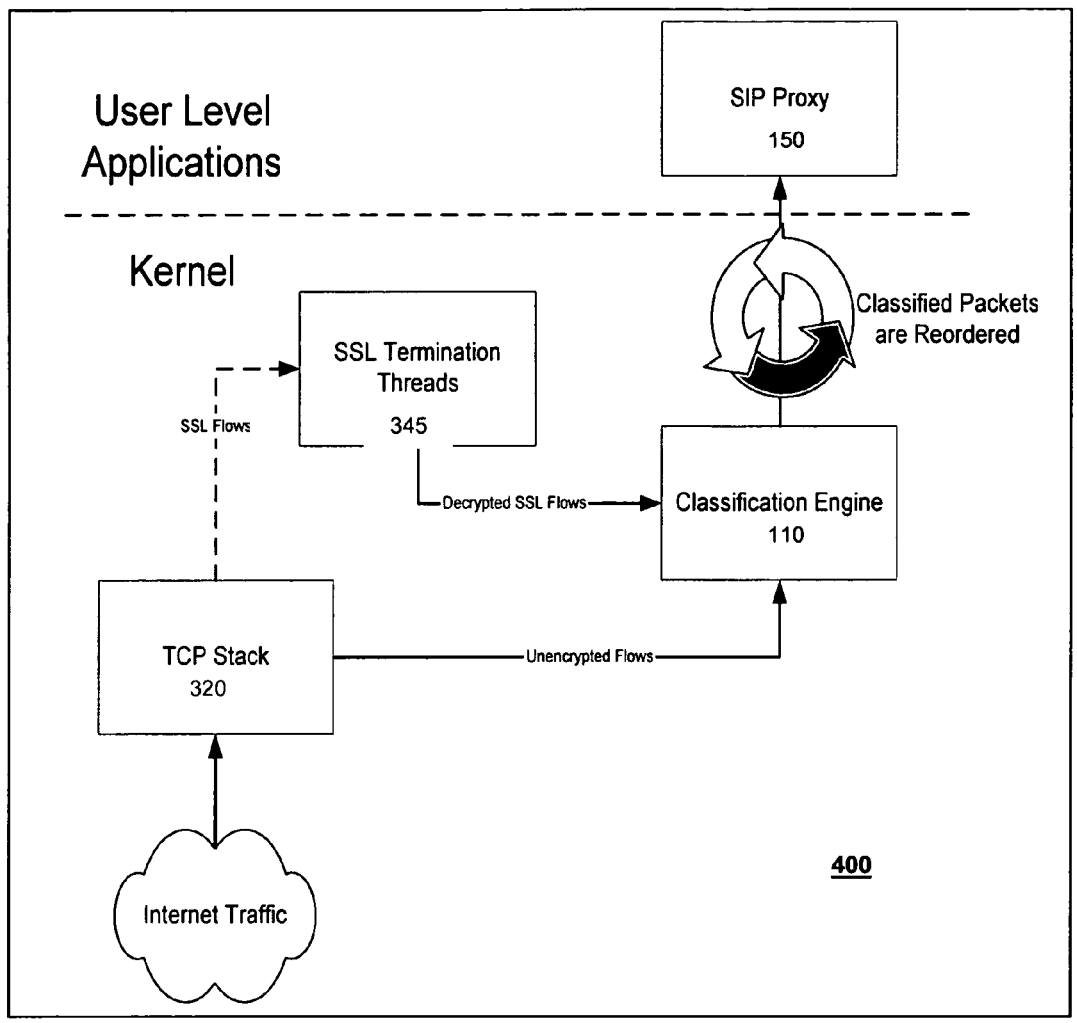
FIG. 4 is a high level diagram showing an embodiment of the invention with an in-kernel SSL termination.
Figure 5:
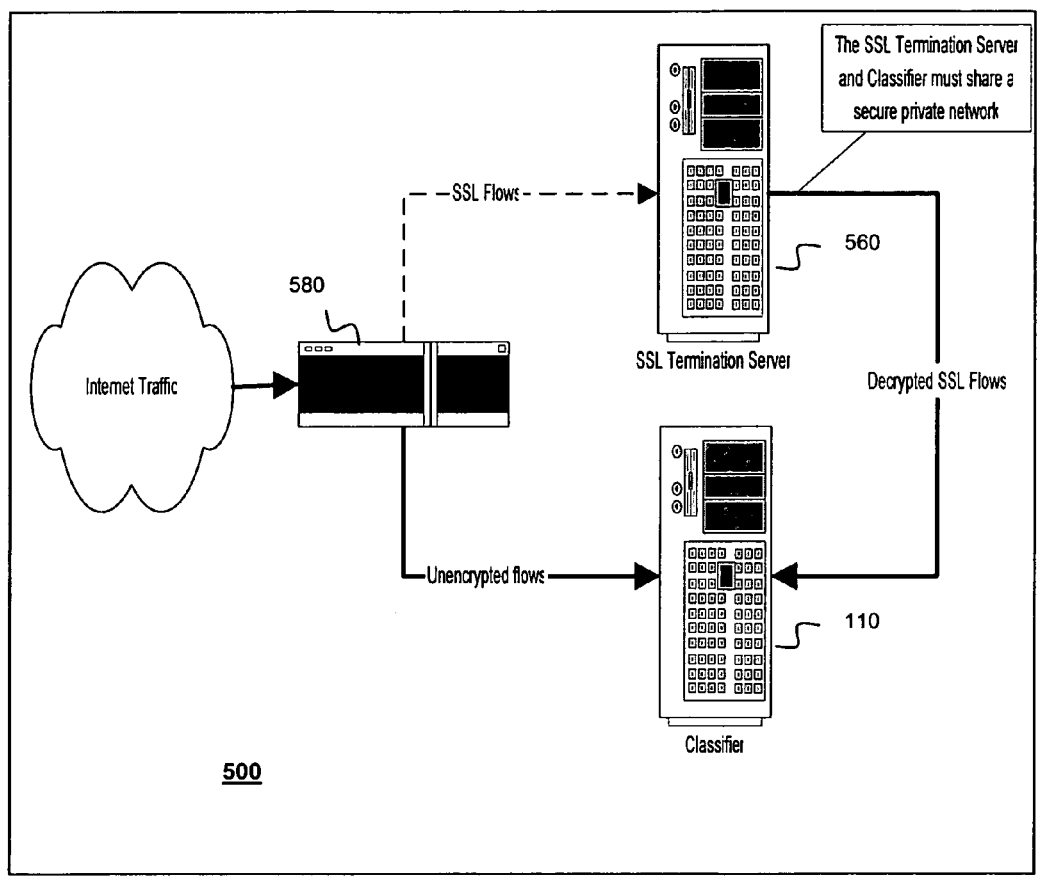
FIG. 5 is a high level diagram showing an embodiment of the invention of an SSL termination using a dedicated server.

FIG. 4 shows an in-kernel termination. This requires more development effort, but should yield improved performance. A TCP Stack 320 is routed in an unencrypted format to the Classifier 110. The classified packets are reordered and sent to the SIP Proxy 150. In this method SSL Termination Threads 345 decrypt SSL messages before routing them to the Classifier 110. A separate SSL Termination Server 560 as shown in FIG. 5 would require development effort slightly less than or equal to the kernel solution of FIG. 4, and would likely yield better performance because significant amounts of processing burden are removed from the Classifier 110. However, the deployment complexity of such a solution would be greater than that of a single machine. A dedicated server 580 routes packets to both the SSL Termination Server 560 and the Classifier 110. The SSL Termination Server 560 and the Classifier 110 share a secure private network.

Referring to FIG. 5, the situation where a single server instance needs to be protected against overload is considered. Here, the SIP classification engine is part of each server. Since the SSL Termination Server 560 is the termination point of the TCP/UDP connection carrying the SIP messages, no separate support [i.e. opening a second transport connection] is needed for transport connection termination. Incoming SIP messages are re-ordered and sent to the user-level SIP control program.

Figure 6:
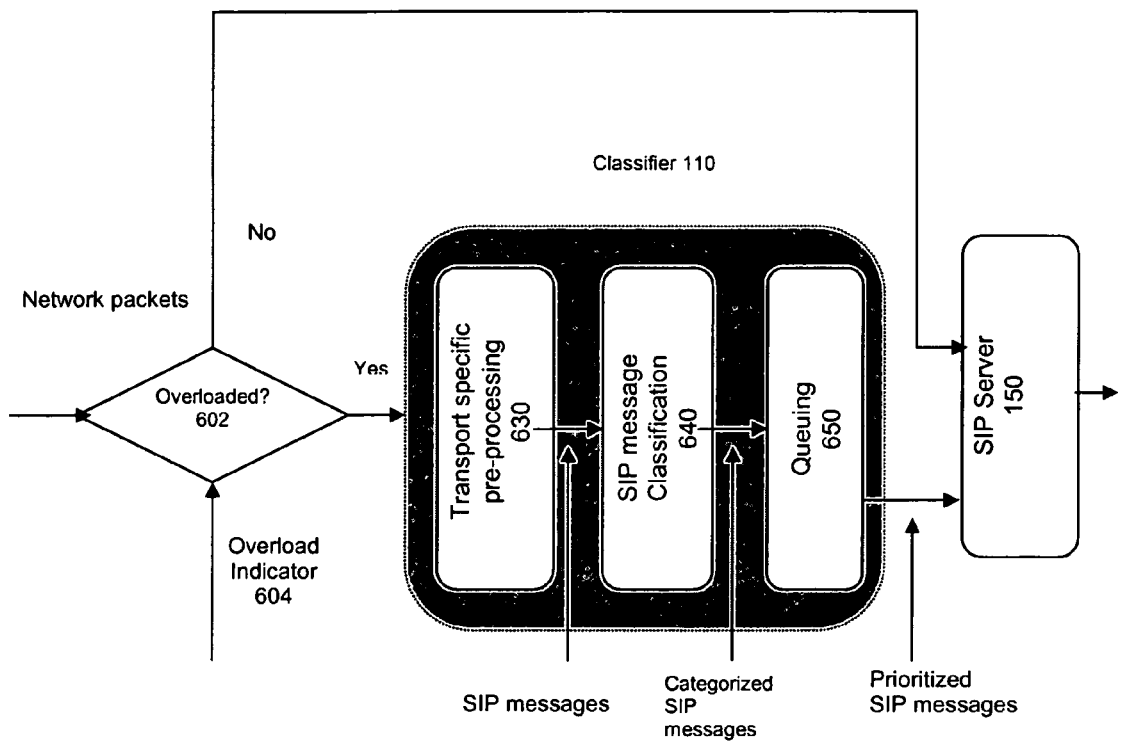
FIG. 6 is a high-level diagram showing an overall context of classifier usage.

FIG. 6 shows an overall context 600 of Classifier 110 usage which will tie in the various scenarios discussed so far. Referring to FIG. 6, network packets are received. A decision 602 is made as to how to process the packets. If the server is overloaded according to an overload indicator 604, the packets are routed to the Classifier 110. The Classifier 110, in its simplest form, comprises three processing functions: transport-specific pre-processing 630, SIP message classification 640, and queuing 650. In an overload condition, the network packet is processed by the transport specific pre-processing function 630 according to its mode of transport (UDP, TCP, etc.). The message is then routed to the SIP message classification function 640 where the messages are placed in categories. The categorized SIP messages are then routed to the queuing function 650 where they are prioritized. The newly-prioritized SIP messages are then sent to the SIP Server 150. Alternatively, if there is no overload condition, the network packets are sent directly to the SIP Server 150 without going through the Classifier 110.

In the case of UDP transport, it is straightforward to intercept the SIP messages since each SIP message is completely contained within a UDP packet. In the case of TCP, data is delivered to the SIP proxy through a socket interface as a byte-stream. The overload protection mechanism is interjected between the TCP implementation and in-kernel socket data structures, so that the byte-stream coming out of the TCP connection can be recognized as a series of messages which are then acted upon by the Classifier 110 (and re-ordered). Note that when TCP is used, each connection to the proxy results in a separate socket data structure (and corresponding TCP control blocks). The classification of messages should be done across multiple connections, i.e., an in-kernel mechanism is provided to allow the Classifier 110 to reorder/drop complete SIP messages across multiple TCP connections and present a single stream of SIP messages to the proxy, as shown in FIG. 1B. This is in contrast to any existing web proxy implementations which do not need to reorder messages across multiple streams.

If the sequence/number of messages received is not the same as what was sent, this would not be a problem for SIP over UDP since the SIP proxy will expect that messages could be lost. But when sent over TCP, message loss/reordering is not expected. If that occurs, a possible scenario is that a server farm is front-ended by a dispatcher. All incoming connections to the SIP server farm are intercepted by the dispatcher. Typically, a layer3/4 dispatcher would distribute incoming SIP requests based on IP-header information. This does not require any connection termination. In case of a proxy-to-proxy connection, this does not work since all incoming connections are between the same source-and-destination IP addresses, and port pairs. This could work for multi-client-one-proxy scenarios since each client has a separate transport connection to the proxy.

An application-layer dispatcher typically would terminate incoming TCP connections, and forward messages from the incoming connections to one of the servers through an already open TCP connection. This works for the client-to-proxy scenario (and requests could be distributed based on the client-proxy 4 tuple) and not for a proxy-to-proxy scenario, since there is a common transport connection on which all requests are multiplexed in the second scenario. This applies to both TCP and UDP transport connections.

It is clear that for the proxy-to-proxy scenario, there may be a need to inspect the SIP messages to make a routing decision. Note that this situation is more complex than a web server scenario, since there is no server-server connection in the web scenario as between SIP proxies (i.e. SIP servers); all web connections are client-server connections without an intermediate proxy. HTTP headers are not meant for 'routing' since HTTP is a client-server protocol; web-proxies in front of a server-farm make opportunistic use of HTTP headers to make simple routing decisions such as forwarding a web request to the least-loaded server in the server farm.

Partitioning routing overload protection functionality between the dispatcher and servers can be achieved in several ways. Below four methods are enumerated:

1) Session Affinity at the dispatcher, Overload-protection at servers: In this option, the dispatcher ensures that all SIP messages belonging to a common dialog are routed to the same SIP proxy. The role of the dispatcher is to try to balance load at the session-level and maintain affinity, but not classify messages for overload control, e.g. if an INVITE for a given session is forwarded to a specific server, then all subsequent messages till the BYE are routed to the same server. However, this requires that some degree of SIP classification work is done at the dispatcher such as identifying the necessary header values in a SIP message to determine the dialog-id (session-id). Alternate ways of doing much coarser-level dispatcher and yet maintain session affinity is to categorize based on destination type, e.g. emergency calls vs. the rest, IM vs. VoIP, internal vs. external calls. These alternate ways require inspection of a single SIP message header value such as the message type (MESSAGE for IM vs. INVITE/OK/ACK etc for Session), or a destination URI (Uniform Resource Identifier). This is the preferred implementation. It has the advantage of (a) using the same Classifier 110 design on the server 150 as well as the front-end dispatcher and (b) scalability, since each server is contributing resources towards overload control rather than relying on a single dispatcher (as outlined in the next option)

2) Overload protection implemented at the dispatcher: In this architecture, all classification of the incoming SIP messages is done at the dispatcher. This may be easier to implement since there is a single control point which is terminating all incoming TCP connections and then (a) prioritizing/reordering messages across all connections followed by (b) distributing the prioritized queues of messages amongst all servers. However, the dispatcher itself could become the bottleneck as opposed to the last option where each server is contributing some fraction of its resources towards classification. Other secondary issues include (a) support for a feedback mechanism from each server to the dispatcher regarding its congestion level (b) handling situations where some of the servers are overloaded while others are not: this has ramifications for maintaining session-level affinity since if a prior message for a given session has been sent to a specific server, all successive messages for that session are to be sent to the same server; and (c) lack of scalability.

3) Layer3/4 dispatcher (which is thus SIP-unaware). The problem here is that proxy-to-proxy interconnections use a single TCP connection (or a small number) to send all SIP messages: all of them will have the same IP/port address pair and thus are not amenable to a pure layer3/4 dispatching solution.

4) Classification rules. A classification rule is defined as a set of conditions and a corresponding action. The result of matching a rule's conditions will be to place an SIP message into one of multiple queues 112, 114, 116. Messages in the same queue will be targeted for the same action, which could be dropping or giving it a high priority. Next, the goal is to come up with a critical mass of rules that make sense in the context of overload control. Prioritization is identified based on:

a) Message types, e.g., a rule may specify that an instant message (MESSAGE) has higher priority than a session setup/modification (INVITE);

b) REGISTER message;

c) Presence subscription and notification;

d) BYE messages: should they always get higher priority;

e) Specific destinations e.g., a call setup to a corporate user (INVITE arup@us.ibm.com) may have lower priority than a call to consumer destination (INVITE arup@gmail.com). Note that the "To" field in a SIP message cannot be used here since it is not used for routing and has no contextual significance at a proxy.

f) Similarly source of the message, e.g. could be the Contact header or the first Via header but not the From for the same reason as To g) Whether messages belong to a session in-progress or a new session setup: the former is identified by having a non-null tag field in the To header h) Within a session, retransmission of a message vs. the first instance the message is being sent? For this, a procmail message-ID cache may be used (a set or list of call-id+cseqs that identify a message). If this message was one of the last N seen, then it is a retransmission and it can be prioritized more highly.

i) message's relative occurrence within a dialog, e.g. can a "100 TRYING SIP/2.0" message be dropped in favor of a "180 RINGING SIP/2.0" and if so, what is the benefit?

The same message type (e.g., INVITE) could lead to different loads depending on the 'routing' policy applied to that message as determined by the destination, for example. An INVITE for one user could lead to it being forwarded onto the next proxy, while the same INVITE message for another user could lead to forking the INVITE to multiple next hop proxies. Thus, all new session setups are not equal; one way to classify new session setups could be based on information provided by the proxy. e.g. the proxy based on the routing policies installed, could specify a list of users/destination prefixes that lead to forking behavior (this assumes that programmatically, it can be determined which policies result in forking).

Additionally, having SIP-level insights regarding relative importance of messages (i.e., something that would not be normally expressed as a business imperative from an operator like 411 messages are more important), enables the system and method of the present invention to provide an additional level of value-add, which could be universally applied across multiple operators.

The final partitioning routing overload protection functionality considered is:

5) Using SIP-level overload control for managing combined SIP-Web workloads. The SIP overload control construct can be used as a building block for managing joint SIP and web workloads. The Classifier 110 can be used to not only prioritize the high-value of messages but also estimate the loss of 'revenue' due to dropped messages. In a server farm that is handling both SIP and web workloads, it is possible that dynamically, a server can be switched to handle one type of workload from the other during times of overload. For example, if the lost revenue from dropping SIP messages (since the servers handling the SIP workload are currently overloaded) is more than the sum of the revenue from handling web requests at another server (from the group of servers serving web workload) and the 'switching cost' of moving a server from handling web to SIP workloads, then it makes sense to dynamically reassign the server to handle SIP workloads.

Additional embodiments are conceived wherein the conditions in the condition-table can be sorted according to header values and then it may be possible to evaluate multiple conditions with the same header in a more efficient way, e.g. the two conditions (From=="Arup") AND (From=="Xiping") cannot both be simultaneously true, so if the first condition is true, the second condition need not be evaluated. One straightforward way is to hash the strings into a numerical value and compare the numerical value with that of the matched header value in the SIP message, thus avoiding string comparisons.

Additionally, an embodiment of the invention implementing a Linux Kernel is discussed. One implementation of the traffic classifier comprises four major components:

1. The classification engine itself, which parses SIP headers and maps messages to a class.
2. Interception of incoming SIP messages via TCP, UDP, and SSL and sending them to the classification engine.
3. After the incoming packet is classified, then an action is performed on this packet.
4. The configuration of the classifier and the actions to perform are transferred from user-level applications (e.g., static configuration scripts or the SIP Proxy) to the kernel.

Each of these components is discussed in turn.

The Classification Engine

The kernel-level classification engine operates exclusively on the tables defined in the algorithm, rather than the rules that define those tables. Supporting user-level programs convert the rule set into the tables before sending the tables into the kernel. Although the user-level compiler should create the tables correctly, the kernel performs limited verification to make sure the tables do not have invalid references (i.e., invalid tables can not crash the kernel but the results of classification may be undefined).

The Parser

The kernel classification engine is based on a custom in-kernel SIP message parser. For each set of rules, the header table acts as a template for a parser. The parser executes in three phases, which map to the three classes of headers defined by the algorithm:

1. Pseudo-headers, such as Message.Type or Message.Protocol. These headers are extracted from the SIP message using pseudo-header-specific parsing functions.
2. Standard headers, such as "From", "To", and "Via," are parsed simultaneously using an efficient Split Backward Oracle Matching multi-string matching module (SBOM). This allows us to extract many simple headers with a single pass through the packet.
3. Derived headers, including sub-headers (e.g., "From.tag") and declared types (e.g., Dialog-ID={From.tag, To.tag, Call-ID}), are extracted from previous entries in the header table.

The parser directly creates header table value structures for each defined header. These header table values are referenced by the condition table, which in turn is referenced by the rule bitmaps. In one embodiment, the present invention does not store copies of the strings in the header table values, but rather a pointer into the packet and length. Eliminating the need for null termination allows the packet's data to be shared with the application, the standard header entries, and also derived headers. The parser provides enough information to the classifier such that it can find the boundaries of SIP traffic. For UDP traffic this is trivial, because there is a 1-1 correspondence between SIP messages and UDP packets. For TCP, the parser validates that the entire header is present (i.e., by the presence of two CrLf's in a row) and that the entire message body (as specified by the Content-Length) header is present. Through proper return codes, the classifier can determine when more information is needed to process the current message. Similarly, the parser informs the classification engine when more than one SIP message is contained within a single buffer.

The Linux kernel stores received buffers in a structure called an sk_buff. The sk_buff structure is designed such that data is rarely copied, and as such an individual packet may include a primary buffer and several fragments. For UDP packets, a simple solution to this problem is to call the skb_linearize function to copy the fragments into a single, larger, buffer. A similar method may be used for TCP packets that span several sk_buffs.

In one embodiment, the invention assumes that there is a 1-1 correspondence between SIP messages and TCP packets. Therefore, it may not correctly classify messages if there is not a 1-1 relationship between TCP packets and SIP messages.

Intercepting Incoming Packets

There are several points at which incoming packets can be intercepted and classified, and it is likely that the exact point to intercept the packets will change based on the deployment scenario. Fortunately, the Linux kernel uses a common sk_buff structure to represent packets at all levels of the code. This means that if the sk_buff abstraction is used as the interface to the classifier engine, it can be deployed in several contexts, including:
1. UDP and TCP receive queues for individual sockets.
2. As part of the Linux netfilter architecture.
3. Policing during ingress (i.e., when being received from the network).
4. Traffic control during egress (i.e., when sending locally generated or forwarding SIP packets).

For the scenario in which protection of a single SIP server is sought, the present invention operates on sk_buffs in the context of individual sockets. When a packet is received from the network it is passed to the tcp_rcv or udp_rcv function, for TCP and UDP packets, respectively. The udp_rcv function locates the associated socket, and then calls udp_queue_rcv_skb, which in turn calls sock_queue_rcv_skb after some error checking. The sock_queue_rcv_skb function inserts the buffer at the tail of the socket's sk_receive queue list and generates a data ready event by calling the sk_data_ready virtual function. When the user-level program reads from this socket, buffers are taken from the head of the sk_receive_queue list.

The TCP receive function is more complex, because it reassembles packets. Moreover, the TCP receive function includes a "ucopy" optimization that bypasses the socket's receive queue when there is a reader waiting on the socket. The TCP receive path also includes both a fast path, used when header prediction has a hit, and a slow path, used when header prediction has a miss. There are four queues for TCP processing in Linux, and the in-flight packets on the wire form a fifth logical queue.

Applying Actions

Each classification rule will have an associated set of actions. The simplest of these actions is to tag the packet with a class identifier. Other actions include:
1. Modifying the classifier's state (e.g., adding a dialog-ID to a set).
2. Dropping the packet.

After a packet is tagged, it is normally placed into one of several queues with different priorities. By prioritizing traffic destined for the SIP proxy, the present invention ensures that high-value traffic is delivered before low-value traffic; that each class of traffic meets a given SLA; and more.

Configuration Management

The kernel-level classifier should be designed to be as simple as possible, simply performing the actions specified by a rule set and dictated by the system's current state. Configuration changes should be communicated to the kernel via ioctls using simple binary data structures.

In addition to managing rules, user-level processes should be able to query and manipulate the classifier's state (e.g., lists of valid call IDs). Moreover, the kernel should have mechanisms for pruning this state periodically (e.g., via expiration) or on-demand (e.g., when the system is under memory pressure).

The kernel expects user-space programs to provide it sensible data, but it only performs limited syntactic verification and type checking on the data provided. This prevents the kernel from crashing, executing infinite loops, or other undesirable behavior, but does not necessarily ensure that classification has defined behavior. The user-level rule compiler is responsible for ensuring that the semantics of the rule set make sense in context of the organization's business imperatives.

The ioctls map directly to the rule syntax and classification engine's data structures. The ioctls according to an embodiment of the invention are structured such that information can be added incrementally, but is removed all at once (with the exception of lists). For rule updates, the classifier should specify an entire new rule set to the kernel, which then atomically replaces the existing rule set.

There is a set of ioctls that manipulate type declarations:
SIP_IOC_TYPE_ADD: Adds a type to classification engine's type list. This ioctl takes a sip_type_declaration structure as an argument, which contains the type's name and a list of strings that make up the headers this type is derived from.
SIP_IOC_TYPE_CLEAR: Clear all types in the type list.

After the types are defined, the header table can be constructed. The header table serves as a template for parsing SIP messages and is managed with three ioctls:
SIP_IOC_HEADER_ADD: Takes a header name (string) as an argument. The kernel checks an internal pseudo-header table (e.g., "Message.Type"), the list of SIP headers for standard headers (e.g., "From") and sub-headers (e.g., "From.tag"). Finally, the type list is checked for the header name. If the header is found it is added to the header table with the appropriate references. Derived headers also resolve any backwards references. Forward references within the header table result in an error, thus "From" should appear before "From.tag" and types which include "From.tag" should appear after "From.tag."
SIP_IOC_HEADER_COMPILE: The compile directive finalizes the header table and creates the necessary runtime structures (e.g., the parser's SBOM trie). Before the compile ioctl, it is not possible for the parser to use the header table. After the compile ioctl, no further additions to the header table are allowed.
SIP_IOC_HEADER_CLEAR: This ioctl removes the header table from the kernel.

After the types are declared, then global and local variables can be defined:
SIP_IOC_SCALAR_ALLOCATE: This ioctl takes the number of global and local scalars as an argument and instantiates the global scalars. Any existing global scalars are destroyed. The number of local scalars that are required, so that when a message is received the appropriate number of locals is allocated. The kernel has no notion of names for any global or local scalars; the classifier can only reference them by index. The user-level compiler ensures that the use of these scalars is sensible, but the kernel will enforce proper type checking during comparison and access. Note that although the rule language defines a pointer type, a pointer is in fact a scalar. The scalars can be freed using the same ioctl by passing zero for the number of global and local scalars.

SIP_IOC_SCALAR_QUERY: Returns the value of a given local or global scalar.

SIP_IOC_LIST_ALLOCATE: This ioctl creates a list with a given name.

SIP_IOC_LIST_FREE: Frees a named list and all of its elements.

SIP_IOC_LIST_QUERY: This retrieves all values of the list into a user-supplied buffer with count entries. Count is updated to reflect the actual number of values in the list.

SIP_IOC_LIST_FIND: Returns true if a value is in a list.

SIP_IOC_LIST_INSERT: Inserts a value in a list.

SIP_IOC_LIST_REMOVE: Removes a value from a list.

After the types and variables are defined a fourth set of ioctls creates the condition table, which is the core of the classification engine. The condition table contains two major elements: (1) the condition and (2) an optional variable for the condition's return value. The condition can in turn be broken down into three subcomponents: (1) left-hand-side, which is a header, pseudo header, or derived header, (2) a binary operator, and (3) a literal.

SIP_IOC_CONDITION_ADD: Each of these five elements is passed into the kernel as part of a structure. The left-hand-side is expressed as an offset into the header table, the binary operator is an integer constant (e.g., SIP_OP_EQUALITY or SIP_OP_EXISTS), and the literal is expressed as a header table value (HTV) structure, and the optional variable is expressed as an index into the local scalars array.

SIP_IOC_CONDITION_NEGATE: Negate the previous condition. This eliminates the need for the kernel to understand "!=" and other similar operators. Moreover, if a condition and its negation are in the rule set, this is more efficient than evaluating both the condition and its negation.

SIP_IOC_CONDITION_FINALIZE: Finalize the condition table (no more conditions can be added after this ioctl is called). The condition table is always complete, and thus does not need to be compiled like the header table. However, the finalize operation is required before rules are added (so that the size of the rule bitmaps always matches the size of a packet's condition bitmap).

SIP_IOC_CONDITION_CLEAR: The condition table is freed.

The condition uses an HTV structure for literals. The HTV structure may consist of a kind and then the value for the kind. The supported kinds are:

HTV_KIND_STRING: A string literal (length and value).

HTV_KIND_INT: An integer value. Note that SIP headers are strings, and integer-like headers (e.g., Expires or Message.Status) are not automatically converted to integers.

HTV_KIND_TUPLE: Zero or more HTV structures that make up a single value. User-defined types are represented as tuples.

HTV_KIND_NOENT: The header does not exist.

HTV_KIND_SLIST: A list of one or more strings. This type is used for multi-valued headers such as "Accept" or "Via."

Finally, the rule bitmaps and associated actions can be passed to the kernel:

SIP_IOC_RULE_ADD: Adds a rule to the classification engine, as specified by a bitmap. The action is specified as an array of action structures.

SIP_IOC_RULE_CLEAR: Clears the list of rules.

The action structures can be of the following types:

SIP_ACTION_COLOR: The message is marked with a specific color (an integer). This color can be used by other components to prioritize the traffic.

SIP_ACTION_DROP: The message is dropped.

SIP_ACTION_ADDINT: Add an integer to a local or global scalar of HTV_KIND_INT.

SIP_ACTION_SETPTR: Modify the value pointed to by a global or local scalar. The type may be a tuple, in which case the element path to modify are specified as integers. For example, if to update "Cb" in ("A", "B", ("Ca", "Cb")), the path 2, 1 would be specified-(because the count begins at zero). In addition to the value to be modified, an HTV for that value is passed.

All headers, conditions, and rules are evaluated in the order that they are added. Thus, the kernel has no specific notion of priorities (as in the rule language), but implicitly enforces priorities based on the order that rules are added.

Supporting overload control in user space is done by modifying read/write library calls from the proxy, essentially implementing the overload control functionality as a library. Supporting overload control when provisioning servers dynamically is accomplished by making additional servers available, i.e. a server that is handling some other workload, is reassigned to handle SIP workloads.

Therefore, while there have been described what are presently considered to be the preferred embodiments, it will understood by those skilled in the art that other modifications can be made within the spirit of the invention.

We claim:

1. A method for operating a server a session initiation protocol (SIP) server having a maximum capacity for servicing requests, the method-comprising steps of:
   a) receiving a plurality of requests for an SIP message session, wherein said plurality of requests comprise: session initiation requests, session modification requests, and requests for binding a user to an address;
   b) classifying each request according to a value, wherein said classifying step comprises:
      b.1) running a classification algorithm at run time, the classification algorithm comprising steps of:
      b.2) receiving a rule set, each rule comprising headers and conditions, wherein the rules with a numerically higher priority value have precedence over the rules with a numerically lower priority value and wherein a first matching rule will be applied for the rules with a same priority value, and the rules are sorted in decreasing order of priority such that a matching process can be stopped after a first matching rule is found; and wherein headers are classified as one of: simple headers, pseudo-headers, and derived headers, and wherein, in conjunction with user-defined derived headers, the user is allowed to specify complex data types comprising structures and complex data variables associated with arrays, pointers, and scalars;
      b.3) creating a condition table by taking a union of all conditions in the rules;
      b.4) creating a header table by extracting a common set of headers from the condition table;
      b.5) extracting the relevant headers from the header table;
      b.6) determining a matching rule;
      b.7) creating a bit vector table;

b.8) selecting the matching rule according to data in the bit vector table; and b.9) applying the matching rule to place the request in an appropriate queue from among a plurality of queues comprising a high priority queue, a medium priority queue, and a low priority queue; and wherein said value of the request is based upon a plurality of message types, the message types comprising: register message; presence subscription and notification; bye messages; specific destinations; source of the message; whether the message belongs to a session-in-progress; whether the message belongs to a new session setup; and within a message, retransmission of a message vs. the first instance the message is being sent;

c) determining a priority for handling the request according to the value, such that requests with higher values are assigned higher priorities;

d) placing each request in one of multiple queues according to its priority value; and e) dropping the requests with the lowest priority when the plurality of requests are received at a rate that exceeds the maximum capacity.

* * * * *